Dec. 8, 1964 R. SPIELDIENER ETAL 3,160,360
LINE-STORING ASSEMBLY FOR TOWING APPARATUS OR THE LIKE
Filed Oct. 10, 1963
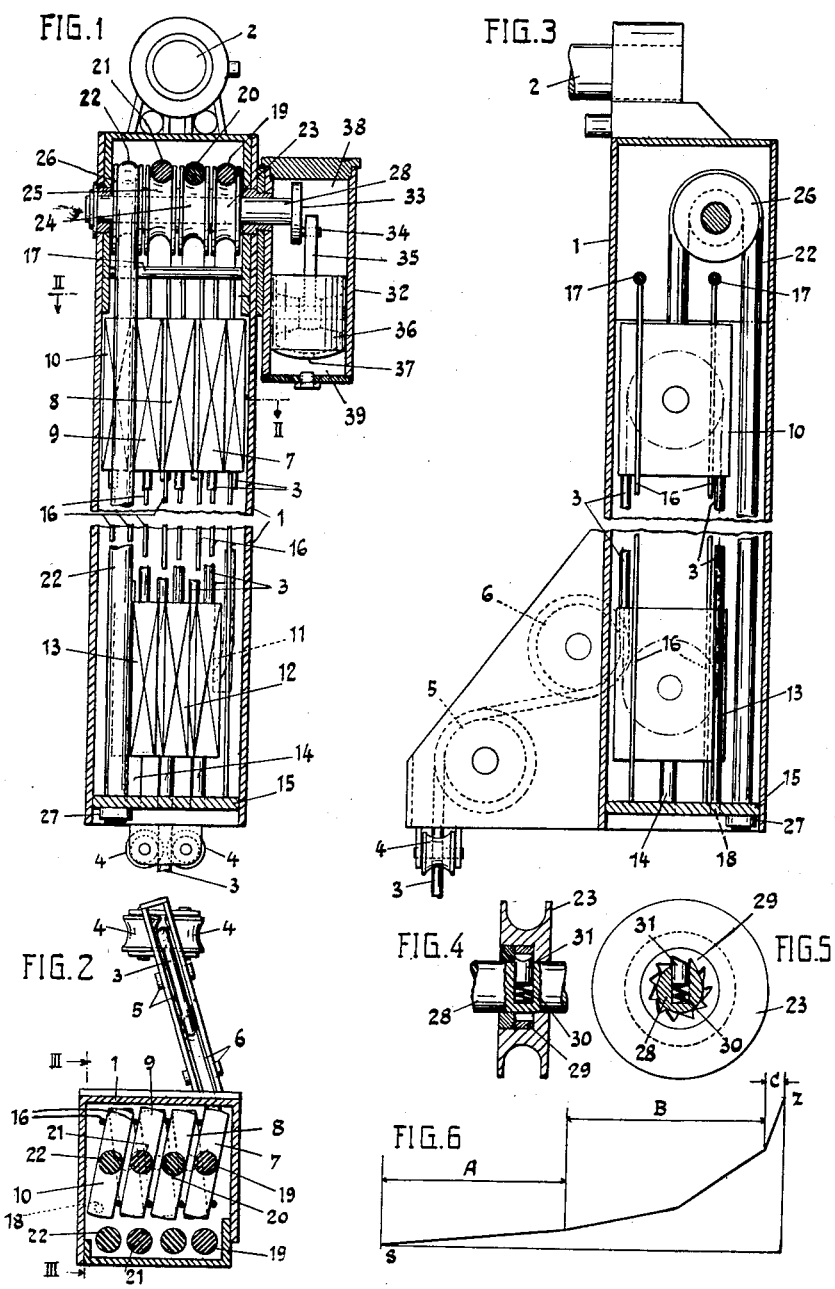
Inventors
Robert Spieldiener
Kurt Lukas
by Michael J. Striker United States Patent Office 3,160,360
Patented Dec. 8, 1964

3,160,360
LINE-STORING ASSEMBLY FOR TOWING
APPARATUS OR THE LIKE
Robert Spieldiener and Kurt Lukas, Sitten, Switzerland,
assignors to Willy Buehler A.G., Bern, Switzerland
Filed Oct. 10, 1963, Ser. No. 315,272
14 Claims. (Cl. 242—47.5)

The present invention relates to line-storing assemblies and is particularly adapted for use with towing apparatus or with any installation requiring gradual paying out of a line and automatic, damped retraction of a line.

For example, there are athletic activities such as skiing and water sports where the participants are transported from one location to another by a towing installation in the form of an endless cable which continuously runs along an endless path and which carries devices such as line-storing assemblies which are grasped by the participants so that while holding on to such assemblies the participants will be pulled from one location to another. Of course, it is undesirable to provide an irregular jerky pull on the participants so that the line-storing assemblies should be constructed in such a way that the line pays out of the assemblies gradually when the participants grab the lines so as to increase the tension thereof, while at the same time the lines should be automatically retracted when the tension decreases. While mention has been made of grasping or grabbing of the line by the user of the assembly, it is to be understood that this manner of use is not essential. For example the line-storing assembly can be used with a seat on which the participant seats himself to be pulled along. Furthermore, it may sometimes happen during use of such assemblies that an obstruction is encountered which gives a sudden increase in the line, and here again a jerky transportation should be avoided. Up to the present time the known assemblies of this type either do not provide sufficiently long lines or sufficient damping, and they are excessively bulky and heavy.

It is accordingly a primary object of the present invention to provide a line-storing assembly of the above type which will be capable of fulfilling all of the above requirements while at the same time avoiding the drawbacks of known line-storing assemblies.

In particular it is an object of the present invention to provide a line-storing assembly which is simple, compact and of light weight while at the same time being capable of storing a considerable length of line so that it can pay out a sufficiently long length of line when the tension therein increases.

It is another object of the present invention to provide a structure which will not only retard the paying out of the line during an increase in the tension thereof but which will also brake or damp the retraction of the line when the tension therein decreases, so that the line is not snapped back into the assembly when it is released but instead moves gradually back into the assembly when the tension is decreased.

Still another object of the present invention is to provide a line-storing assembly in which the force which retards the paying out of the line during an increase in the tension thereof gradually increases as the line is payed out so that during initial pulling of the line from the assembly a relatively small force retards the paying thereof out of the assembly while as the line continues to be payed out of the assembly the retarding force increases in a regular manner.

With the above objects in view the invention includes, in a line-storing assembly for towing apparatus or the like, a support means and a row of sheaves supported for rotary movement by the support means. A row of sheave-carrying blocks are guided by a guide means, which is carried by the support means, for free movement toward and away from the row of sheaves with the guide means guiding each block for free movement independently of the other blocks. A line is reeved over the sheaves and through the blocks, is fixed at one end to the support means and extends freely from the assembly. A plurality of spring means are connected to the support means and are respectively connected to the blocks for individually opposing movement thereof toward the row of sheaves, so that the plurality of spring means retard paying of the line out of the assembly during an increase in the tension of the line and retract the line into the assembly during a decrease in the tension of the line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional elevation of one possible construction of a line-storing assembly according to the present invention;

FIG. 2 is a sectional plan view taken along line II—II of FIG. 1 in the direction of the arrows;

FIG. 3 is a longitudinal sectional elevation of the apparatus taken along line III—III of FIG. 2 in the direction of the arrows but extended over the entire height of the apparatus, the plane of FIG. 3 of course being perpendicular to the plane of FIG. 1;

FIG. 4 is a fragmentary partly sectional illustration of the details of one of a plurality of overrunning clutches which form part of the structure;

FIG. 5 is a partly sectional side elevation of the structure of FIG. 4; and

FIG. 6 is a diagrammatic illustration of the manner in which the structure operates.

The illustrated line-storing assembly includes a support means formed by the box-like frame 1 made of rigid sheets of metal, for example, and the top of the support means 1 fixedly carries an arm 2 which is fixed in a manner well known in the art to the unillustrated cable which moves continuously along an endless path in order to tow the users of the apparatus, as is well known. The line 3 in the form of a suitable rope or cable extends freely from the assembly and at its free end which is located beyond the assembly is adapted to be attached to the load. For example, the unillustrated free end of the line 3 can carry a suitable handle which may be gripped by the user or a seat or the like on which the user may be seated while being towed.

This line 3 extends from the exterior of the assembly through the pair of guide rollers 4, supported by suitable brackets of the support means 1, over the sheave 5 and under the sheave 6 into the interior of the support means, these sheaves 5 and 6 being supported for rotation between a pair of plates which extend from the box-like frame in the manner shown most clearly in FIGS. 2 and 3, and of course the sheave 6 extends through a cutout of a wall of the frame 1 into the interior thereof so that after passing around the sheave 6 the line will be in the interior of the frame 1. Thus, the rollers 4 and the sheaves 5 and 6 are simply supported for free rotary movement at all times.

Within the support means 1 is located a row of sheave-carrying blocks 7–10. A second row of sheaves are carried by the support means 1 adjacent the lower end thereof within the blocks 11–13, so that in the illustrated example there are three lower sheaves and four upper sheave-carrying blocks. The line 3 after passing from the sheave 6 into the interior of the frame 1 is reeved through the blocks 7–10 and over the sheaves within the blocks 11–13. A plurality of bars 14 are fixedly carried by the bottom wall 15 of the frame 1, and the blocks 11–13 are fixed to the top ends of the bars 14, so that the row of lower sheaves can only turn about their axes, respectively. On the other hand, the structure of the invention includes a guide means which guides each of the blocks 7–10 for free movement independently of the other blocks toward and away from the lower row of sheaves. This guide means takes the form of a plurality of elongated wires 16 fixed at their lower ends to the bottom wall 15 and at their upper ends to a pair of transverse rods 17 which extend between and are fixed to a pair of opposed side walls of the frame 1. The arrangement of the wires 16, shown most clearly in FIGS. 2 and 3, is such that each side face of each of the blocks 7–10 slidably engages a pair of the wires 16, except for the outer side faces of the end blocks 7 and 10, these outer side faces being each engaged by only one wire 16, as is apparent from FIG. 2. The line 3 is reeved from the sheave 6 first through the block 7, then over the sheave within the block 11, then through the block 8, and so on over the sheave in the block 12, through the block 9, over the sheave in the block 13, and finally through the block 10, and the line then extends downwardly from the block 10 to have its free end 18 fixed to the bottom wall 15, as indicated in FIGS. 2 and 3. It is to be noted that the guide wires 16 displace the several blocks 7–10 angularly with respect to the sheaves in the lower blocks 11–13 to an extent which will provide the line with runs extending between the lower sheaves and the upper blocks in directions parallel to each other and to the guide wires 16 which of course extend perpendicularly with respect to the several axes of all of the sheaves.

A plurality of spring means are connected to the support means 1 and respectively to the blocks 7–10 for individually opposing the movement of the blocks 7–10 toward the lower row of sheaves, and in the illustrated example the plurality of spring means take the form of a plurality of elongated elastic stretchable members 19–22 made, for example, of soft rubber or of a material which has the properties of soft rubber, such as a suitable synthetic plastic.

The structure includes a third row of sheaves 23–26 over which the several elastic members 19–22 respectively pass from the several blocks 7–10 to which they are respectively fixed, and after passing over the sheaves 23–26, the elongated elastic stretchable members 19–22 are fixed at their ends distant from the blocks 7–10 to the bottom wall 15. For example, as is shown at the lower parts of FIGS. 1 and 3, the elastic members 19–22 may pass through openings of the wall 15, respectively, and fixedly carry suitable anchoring collars 27 or the like which engage the underside of the wall 15 so as to fix the ends of the elastic members 19–22 thereto. These elastic members 19–22 are pretensioned to different extents, the tension of the elastic member 19 which is connected to the first block 7 through which the line 3 is reeved being less than the tension of the remaining elastic members, while the pretension of the elastic member 22 connected to the last block 10 through which the line 3 is reeved is greater than the pretension of the remaining elastic members, and the intervening elastic members 20 and 21 are pretensioned to increasing degrees which progressively increase from the pretension of the elastic member 19 toward the pretension of the elastic member 22, so that the elastic member 20 has a pretension greater than the member 19 but less than the member 21, while the elastic member 21 has a pretension greater than member 20 but less than the member 22.

A shaft 28 is supported for free rotation in suitable bearings carried by opposed side walls of the frame 1 and is restrained against axial movement in any suitable way, and the several sheaves 23–26 are supported for free rotary movement on the shaft 28 which extends through these sheaves. A plurality of overrunning clutch means are respectively connected to the sheaves 23–26 and to the shaft 28 so that rotation of the sheaves 23–26 is transmitted to the shaft 28 only when the sheaves 23–26 turn in a given direction. The several overrunning clutch means are arranged to provide transmission of rotation from the sheaves 23–26 to the shaft 28 only when the sheaves 23–26 turn during contraction of the elastic members 19–22, respectively, and, of course, during simultaneous contraction of the elastic members 19–22 or any group of two or three of these elastic members, the shaft 28 will be turned by that one of the sheaves which rotates at the greatest speed.

The details of the overrunning clutch means operatively connected to the sheave 23 is shown in FIGS. 4 and 5, and it is to be understood that the remaining plurality of overrunning clutch means respectively connected to the sheaves 24–26 are identically constructed. Thus, referring to FIGS. 4 and 5 it will be seen that at its interior hub portion the sheave 23 carries between side wall portion thereof an internal ratchet gear 29 which is fixed to the sheave 23 and which has its teeth surrounding the shaft 28. The shaft 28 houses in a bore thereof a pin 31 urged by the spring 30 outwardly of the shaft 28 into engagement with the teeth of the ratchet gear 29. Of course, the end of the pin 31 which engages the teeth of the gear 29 is suitably sloped as shown most clearly in FIG. 5. It is apparent from FIG. 5 that when the sheave 23 turns in a counterclockwise direction relative to the shaft 28 it will turn freely on the shaft 28 without transmitting rotation thereto while when the sheave 23 turns in a clockwise direction relative to the shaft 28 which will transmit its rotation to the shaft 28 through the overrunning clutch means 29–31.

A braking or damping means is provided for damping the rotation of the shaft 28 when it is turned by one of the sheaves 23–26, and this braking or damping means includes the cylinder 32 carried by the support means 1 as shown at the upper right of FIG. 1. The damping means further includes a crank disc 33 fixed to the end of the shaft 28 which projects into the cylinder 32, and this crank disc 33 fixedly carries a crank pin 34, displaced from the axis of the shaft 28, and pivotally connected with a piston rod 35 which is in turn pivotally connected with a piston 36 which is slidable within the cylinder 32. The interior cylinder chambers 38 and 39 on both sides of the piston 36 are filled with a damping liquid such as oil, and a passage means is provided to throttle the flow of the damping liquid during movement of the piston. In the illustrated example this passage means takes the form of a wall portion of the piston 36 which is formed with the throttling opening 37 passing therethrough.

During operation of the towing apparatus, the endless cable thereof runs continuously. This cable carries several of the line-storing assemblies of the invention, these assemblies being distributed along the cable, and the free end of the line of each assembly carries a device accessible to the user so that he can be towed, this device in the case of a ski lift being a suitable arcuate member on which the user may seat himself to be pulled along while in the case of water sports a simple hand grip may be provided at the end of the line to be grasped by the water skier. Also, the line may carry a hook by which a floating body is attached to the line to maintain the free end thereof accessible to the user.

In the diagram of FIG. 6 the ordinate Z represents the tension in the line while the abscissa S represents the extent to which the line 3 is pulled from the assembly for a given unit of time. During the initial period A when the line is initially loaded there will be a relatively small increase in the tension of the line as it is pulled from the assembly, inasmuch as there is initially only an increase in the tension of the elongated elastic member 19 which has the minimum pretension, and initially only the block 7 will be pulled toward the lower row of sheaves. In order to accelerate the movement of the load the tension in the line is required to increase at a rate greater than the slight gradual increase in the tension of the member 19, and during continued paying out of the line from the assembly the second elastic member 20 will have its tension increased while the block 8 moves toward the lower row of sheaves and then the third elastic member 21 will also be stretched further while the block 9 shifts toward the lower row of sheaves, so that during this time the tension in the line increases and the tendency of the line to be pulled out of the assembly is retarded with an increasing retarding force, shown in the range B of the diagram of FIG. 6, which increases at a rate greater than the rate of increase during the period A. During the movement of the blocks 7–9 toward the lower row of sheaves the elastic members 19–21 stretch and turn the sheaves 23–25, but at this time the direction of rotation of the sheaves is such that their rotation will not be transmitted by the over-running clutches to the shaft 28, so that the sheaves 23–25 at this time simply turn freely on the shaft 28. The elastic member 22 which is under the greatest pretension is the last to yield while the block 10 is pulled toward the lower row of sheaves, and at this time the rate of increase of the retarding force is sharply greater than the previous rates of increase thereof, as shown in the period C in the diagram of FIG. 6, the tension in the line increasing at this time to a very large extent with respect to paying of the line out of the assembly, because of the relatively great pretension of the elastic member 22, and this member 22 and the block 10 are provided to take care of suddenly encountered obstructions, and this part of the structure operates to provide a jerk-free smooth pulling of the load even when such obstructions are encountered.

In order to avoid sudden pulling of the line back into the assembly during a sudden decrease in the tension, as when the load moves beyond an obstruction or the like, or when the line is released, the rotation of the sheaves 23–26 is transmitted by the overrunning clutches to the shaft 28 during contraction of the elastic members 19–22, that one of the sheaves 23–26 which turns fastest at this time being the one which transmits its rotation to the shaft 28, so that the rotating shaft 28 actuates the braking or damping means 32–39 to retard the speed with which the line is retracted into the assembly under these conditions. The throttled flow of the liquid in the cylinder 32 through the opening 37 during movement of the piston acts to brake the rotation of the shaft 28, and this braking action in particular damps the retraction of the line into the assembly when it is released by the user of the assembly.

As was mentioned above, the line-storing assembly of the invention can be used not only with a towing apparatus but also in any situation which requires a predetermined gradual paying out of the line and an automatic, braked retraction of the line.

It will be understood that each of the elements described above, or two or more together, may also find a useful application in other types of line-storing assemblies differing from the types described above.

While the invention has been illustrated and described as embodied in line-storing assemblies for towing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a line-storing assembly for a towing apparatus or the like, in combination, support means; a row of sheaves supported for rotary movement by said support means; a row of sheave-carrying blocks; guide means carried by said support means and guiding each block for free movement toward and away from said row of sheaves independently of the other blocks; a line reeved over said sheaves and through said blocks, fixed at one end to said support means, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the tension of the line.

2. In a line-storing assembly for a towing apparatus or the like, in combination, support means; a row of sheaves supported for rotary movement by said support means; a row of sheave-carrying blocks; guide means carried by said support means and guiding each block for free movement toward and away from said row of sheaves independently of the other blocks; a line reeved over said sheaves and through said blocks, fixed at one end to said support means, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the tension of the line, said spring means being pretensioned.

3. In a line-storing assembly for a towing apparatus or the like, in combination, support means; a row of sheaves supported for rotary movement by said support means; a row of sheave-carrying blocks; guide means carried by said support means and guiding each block for free movement toward and away from said row of sheaves independently of the other blocks; a line reeved over said sheaves and through said blocks, fixed at one end to said support means, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the tension of the line, each of said spring means being in the form of an elongated stretchable member having the properties of soft rubber.

4. In a line-storing assembly for a towing apparatus or the like, in combination, support means; a row of sheaves supported for rotary movement by said support means; a row of sheave-carrying blocks; guide means carried by said support means and guiding each block for free movement toward and away from said row of sheaves independently of the other blocks; a line reeved over said sheaves and through said blocks, fixed at one end to said support means, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the tension of the line, said plurality of spring means being respectively pretensioned to different extents with the first block through which the line is reeved being connected to the spring means of least tension, the last block through which the line is reeved being connected to the spring means of greatest pretension, and with the intervening blocks between said first and said last blocks being respectively connected to spring means which are tensioned respectively to increasing degrees progressing from said first toward said last block.

5. In a line-storing assembly for towing apparatus or the like, in combination, support means; a row of first sheaves supported for rotation by said support means; a row of sheave-carrying blocks; guide means carried by said support means and guiding said blocks for free movement independently of each other toward and away from said row of sheaves; a row of second sheaves also supported for rotary movement by said support means; a plurality of elongated elastic stretchable members respectively fixed at one of their ends to said blocks, respectively passing around said plurality of second sheaves and respectively having their ends distant from said blocks fixed to said support means; a line reeved over said first sheaves and through said blocks, said line extending freely from the assembly and having an end fixed to said support means, whereby said plurality of elastic members retard paying of said line out of the assembly during an increase in the tension of the line and retract the line into the assembly during a decrease in the tension of the line; and brake means cooperating with said second sheaves for braking the rotation thereof when said second sheaves turn in a given direction.

6. In a line-storing assembly for towing apparatus or the like, in combination, support means; a row of first sheave supported for rotation by said support means; a row of sheave carrying blocks; guide means carried by said support means and guiding said blocks for free movement independently of each other toward and away from said row of sheaves; a row of second sheaves also supported for rotary movement by said support means; a plurality of elongated elastic stretchable members respectively fixed at one of their ends to said blocks, respectively passing around said plurality of second sheaves and respectively having their ends distant from said blocks fixed to said support means; a line reeved over said first sheaves and through said blocks, said line extending freely from the assembly and having an end fixed to said support means, whereby said plurality of elastic members retard paying of said line out of the assembly during an increase in the tension of the line and retract the line into the assembly during a decrease in the tension of the line; and brake means cooperating with said second sheaves for braking the rotation thereof when said sheaves turn in a given direction, said brake means comprising a member which rotates with said second sheaves when the latter turn in said given direction of rotation, a crank fixed to said member, a cylinder, a piston reciprocating in said cylinder and connected to said crank to be moved thereby in said cylinder, hydraulic liquid in said cylinder, and passage means cooperating with the liquid for damping the movement of the piston.

7. In a line-storing assembly for towing apparatus or the like, in combination, an elongated supporting frame; a row of sheaves supported for rotary movement by said frame; a row of sheave-carrying blocks; a plurality of elongated guide-wires fixedly carried by said frame, extending perpendicularly to said rows and at least two of said wires engaging each block at opposed side faces thereof for guiding each block for free movement independently of the other blocks toward and away from said row of sheaves; a line reeved over said sheaves and through said blocks, fixed at one end to said supporting frame, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the assembly of the line.

8. In a line-storing assembly for towing apparatus or the like, in combination, an elongated supporting frame; a row of sheaves supported for rotary movement by said frame; a row of sheave-carrying blocks; a plurality of elongated guide-wires fixedly carried by said frame, extending perpendicularly to said rows and at least two of said wires engaging each block at opposed side faces thereof for guiding each block for free movement independently of the other blocks toward and away from said row of sheaves; a line reeved over said sheaves and through said blocks, fixed at one end to said supporting frame, and extending freely from the assembly; and a plurality of spring means connected to said support means and respectively connected to said blocks for individually opposing movement thereof toward said row of sheaves, whereby said spring means retard paying of the line out of said assembly during an increase in the tension of the line and retract the line into the assembly during a decrease in the assembly of the line, said guide-wires locating said blocks in positions angularly displaced with respect to said row of sheaves to an extent which provides substantially parallel runs of the line between said sheaves and blocks with said runs of said line being substantially parallel to said wires.

9. In a line-storing assembly for towing apparatus or the like, in combination, support means; a row of first sheaves supported for rotary movement by said support means; a row of sheave-carrying blocks; guide means carried by said support means and guiding each block for free movement toward and away from said row of sheaves independently of the other blocks; a line reeved over said sheaves and through said blocks, fixed at one end to said support means, and extending freely from the assembly; a shaft supported for rotary movement by said support means; a row of second sheaves freely turnable on said shaft; a plurality of elongated elastic stretchable members respectively fixed to said blocks, respectively passing over said second sheaves, and respectively fixed to said support means at their ends distant from said blocks, whereby said plurality of elastic members retard paying of the line out of the assembly during an increase in the tension of the line and retract the line into the assembly during a decrease in the tension of the line; a plurality of overrunning clutch means respectively connected operatively to said row of second sheaves and said shaft for transmitting rotation of said second sheaves to said shaft only when said second sheaves turn during contraction of said elastic members when the tension in the line decreases, said second sheaves turning freely relative to the said shaft during elongation of said elastic members when the tension in the line increases, so that during a decrease in the tension of the line said shaft will be turned by that one of said second sheaves which turns faster than the other second sheaves; and damping means operatively connected to said shaft for damping the rotation thereof.

10. In an assembly as recited in claim 9, said plurality of overrunning clutch means including a plurality of internal ratchet gears respectively fixed to said second sheaves and surrounding said shaft and a plurality of spring-pressed pins carried by said shaft and engaging said ratchet gears, respectively.

11. In an assembly as recited in claim 10, said shaft being formed with bores in which said spring-pressed pins are respectively located.

12. In an assembly as recited in claim 9, said damping means including a cylinder containing a damping liquid, a piston shiftable in said cylinder, passage means retarding movement of the piston in the liquid of the cylinder, and a crank fixed to said shaft for rotary movement therewith and operatively connected to said piston.

13. In an assembly as recited in claim 12, said passage means being formed by a wall of said piston which is formed with an opening passing therethrough, the liquid being in the cylinder on opposite sides of said piston.

14. In an assembly as recited in claim 13, said shaft extending into said cylinder and said crank being housed within said cylinder.

References Cited in the file of this patent

UNITED STATES PATENTS

| | | |
|---|---|---|
| 1,384,153 | Roos | July 12, 1921 |
| 1,458,654 | Hotopp | June 12, 1923 |
| 2,482,851 | Jennewein | Sept. 27, 1949 |

FOREIGN PATENTS

| | | |
|---|---|---|
| 229,205 | Australia | July 5, 1960 |